United States Patent [19]

Matsushima

[11] Patent Number: 5,381,529
[45] Date of Patent: Jan. 10, 1995

[54] SHIFT REGISTER WITH DUAL CLOCK INPUTS FOR RECEIVING AND SENDING INFORMATION BETWEEN I/O CHANNELS AND HOST BASED ON EXTERNAL AND INTERNAL CLOCK INPUTS RESPECTIVELY

[75] Inventor: Osamu Matsushima, Tokyo, Japan

[73] Assignee: NEC Corporation, Tokyo, Japan

[21] Appl. No.: 937,652

[22] Filed: Aug. 31, 1992

[30] Foreign Application Priority Data

Aug. 30, 1991 [JP] Japan .................................. 3-219719

[51] Int. Cl.⁶ .............................................. G06F 13/20
[52] U.S. Cl. ............................. 395/275; 395/500; 364/238.2; 364/238.7; 364/DIG. 1; 327/407
[58] Field of Search ..................... 395/275, 175, 500; 328/154

[56] References Cited

U.S. PATENT DOCUMENTS

| | | | |
|---|---|---|---|
| 4,006,465 | 2/1977 | Cross et al. | 395/275 |
| 4,532,557 | 7/1985 | Larkins | 360/33.1 |
| 4,816,996 | 3/1989 | Hill et al. | 395/275 |
| 4,974,199 | 11/1990 | Verbanets, Jr. et al. | 395/275 |

FOREIGN PATENT DOCUMENTS 145319 6/1985 European Pat. Off. .
266790 5/1988 European Pat. Off. .

Primary Examiner—Thomas C. Lee
Assistant Examiner—Sang Huikim
Attorney, Agent, or Firm—Whitham, Curtis, Whitham & McGinn

[57] ABSTRACT

A serial interface circuits internally provided in a microcomputer and including a shift register is provided with two sets of terminals, each set including a serial data input terminal, a serial data output terminal and a clock terminal, and the two sets of terminals am alternatively used by a serial channel selection flag. Thus, a multi-channel serial interface is realized.

4 Claims, 2 Drawing Sheets

SHIFT REGISTER WITH DUAL CLOCK INPUTS FOR RECEIVING AND SENDING INFORMATION BETWEEN I/O CHANNELS AND HOST BASED ON EXTERNAL AND INTERNAL CLOCK INPUTS RESPECTIVELY

BACKGROUND OF THE INVENTION

1. Field of the Invention

The present invention relates to a microcomputer, and more specifically, to a multi-channel serial interface circuit internally included in a microcomputer.

2. Description of Related Art

A serial interface function is internally provided in many microcomputers, since it can realize a data transfer with a small-number of terminals. In general, the serial interface has been such that data is transferred by using a serial data input terminal, a serial data output terminal and a clock terminal.

In recent application systems of microcomputers, it has become difficult for one microcomputer to perform all processings because of diversification in function of the application systems. Therefore, it is now more and more increasing that a main microcomputer is connected with a plurality of slave devices including a slave microcomputer and an electrically erasable ROM (read only memory) by means of a serial interface, so that the processing is shared so as to perform a whole control.

In the prior art, for example, if three channel interfaces are required in order to couple with three slave devices, a microcomputer has been constructed to internally include three channels of the same serial interface circuit blocks.

Thus, the structure of the conventional serial interface has given rise to an increase of a whole circuit scale of the microcomputer and a cost-up of the application system. In addition, since it is very difficult that the three channels of serial interface circuit blocks internally provided in the microcomputer ate simultaneously used by only one central processing unit provided in the microcomputer, it has been in many practical cases that only two channels are simultaneously operated, and the remaining only channel is utilized in an idle time. Therefore, the hardware resources internally provided in the microcomputer are not effectively utilized.

SUMMARY OF THE INVENTION

Accordingly, it is an object of the present invention to provide a multi-channel serial interface circuit internally provided in a microcomputer, which has overcome the above mentioned defect of the conventional one.

Another object of the present invention is to provide an inexpensive multi-channel serial interface circuit internally provided in a microcomputer.

The above and other objects of the present invention are achieved in accordance with the present invention by a serial interface circuit internally provided in a microcomputer and having a serial data input terminal, a serial data output terminal and a clock terminal, the serial interface comprising a shift register for performing a shift operation in synchronism with a predetermined clock signal, at least two sets of terminals, each set including a serial data input terminal, a serial data output terminal and a clock terminal, which are coupled to the shift register, and means for selecting one set of terminals from the at least two sets of terminals, the selecting means being controlled by a programmed operation so as to switch the serial interface function between the at least two sets of terminals.

As seen from the above, the serial interface circuit in accordance with the present invention internally provided in the microcomputer is characterized in that the serial interface includes at least two sets of terminals, each set including a serial data input terminal, a serial dam output terminal and a clock terminal, and the serial interface function is selectively switched between the at least two sets of terminals under a programmed control of the microcomputer. Therefore, the microcomputer can include therein an inexpensive multi-channel serial interface circuit.

The above and other objects, features and advantages of the present invention will be apparent from the following description of preferred embodiments of the invention with reference to the accompanying drawings.

DESCRIPTION OF THE PREFERRED EMBODIMENTS

Figure 1:
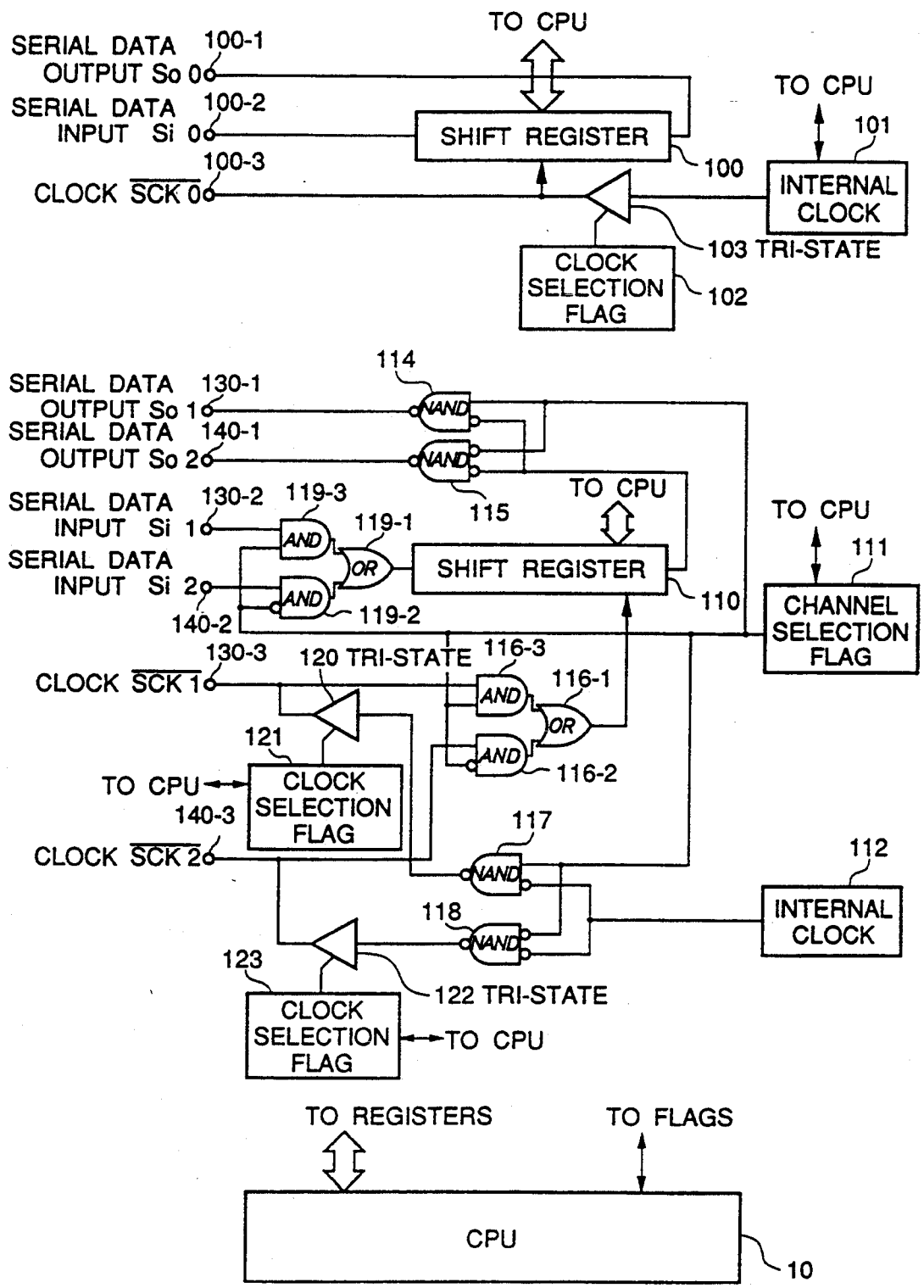
FIG. 1 is a block diagram of a first embodiment of the serial interface in accordance with the present invention.

Referring to FIG. 1, there is shown a block diagram of a tint embodiment of the serial interface in accordance with the present invention internally provided in a microcomputer.

The shown serial interface circuit includes a 8-bit shift register 100 having a dam input connected to a serial data input terminal SiO 100-2 and a clock input connected to a clock terminal $\overline{SCKO}$ 100-3, so that the shift register 100 sequentially stores, bit by bit, a level on the SiO terminal 100-2 in synchronism with a clock signal on the $\overline{SCKO}$ terminal 100-3. The shift register 100 also has a data output connected to a serial data output terminal SoO 100-1, so that data stored in the shift register 100 is serially shifted out, bit by bit, to the SoO terminal 100-1 in synchronism with the clock signal on the $\overline{SCKO}$ terminal 100-3. There is also provided an internal clock generation circuit 101, and a tri-state buffer 103 having an input corrected to the internal clock generation circuit 101 and an output connected to the $\overline{SCKO}$ terminal 103-1 and hence to the clock input of the shift register 100. A control terminal of the tri-state buffer 103 is connected to a clock selection flag 102 for selection between the internal clock generation circuit 101 and an external clock.

Furthermore, the serial interface circuit includes another shift register 110, which has a data input connected to an output of an OR gate 119-1 having two-inputs connected to a output of two AND gates 119-3 and 119-2, respectively. A first non-inverted input of the AND gate 119-3 is connected to a second serial data input terminal Si1 130-2, and an non-inverted input of the AND gate 119-2 is connected to a third serial data input terminal Si2 140-2. A second non-inverted input of the AND gate 119-3 and an inverted input of the AND gate 119-2 are connected in common to a serial channel selection flag 111.

A data output of the shift register 110 is connected in common to an inverted input of a NAND gate 114 and a first inverted input of a NAND gate 115. A non-inverted input of the NAND gate 114 and a second inverted input of the NAND gate 115 are connected in common to the serial channel selection flag 111. An output of the NAND gate 114 is connected to a second serial data output terminal Sol 130-1, and an output of the NAND gate 115 is connected to a third serial data output terminal So2 140-1.

The shift register 110 has a clock input connected to an output of an OR gate 116-1 having two inputs connected to an output of two AND gates 116-3 and 116-2, respectively. A first non-inverted input of the AND gate 116-3 is connected to a second clock input terminal $\overline{SCK1}$ 130-3, and a non-inverted input of the AND gate 116-2 is connected to a third clock input terminal SCK2 140-3. A second non-inverted input of the AND gate 116-3 and an inverted input of the AND gate 116-2 are connected in common to the serial channel selection flag 111.

The $\overline{SCK1}$ terminal 130-3 is also connected to an output of tri-state buffer 120, which is controlled by a clock selection flag 121. An input of the tri-state buffer 120 is connected to an output of a NAND gate 117 which in turn has a non-inverted input connected to the serial channel selection flag 111 and an inverted input connected to another internal clock generation circuit 112.

The $\overline{SCK2}$ terminal 140-3 is connected to an output of a tri-state buffer 122, which is controlled by a clock selection flag 123. An input of the tri-state buffer 122 is connected to an output of a NAND gate 118, which in turn has a first inverted input connected to the serial channel selection flag 111 and a second inverted input connected to the internal clock generation circuit 112.

The $\overline{SCKO}$ terminal 100-3, the $\overline{SCK1}$ terminal 130-3 and the $\overline{SCK2}$ terminal 140-3 are normally maintained at a logic value "1", and only when, in the serial data transfer, data from an external is received by the shown serial interface circuit, eight clocks of the logic value "0" are supplied to these clock terminals from the external. Similarly, the clock generation circuits 101 and 112 are configured to normally maintain their output at a logic value "1", and to generate eight clocks of the logic value "0" only when, in the serial data transfer, the shown serial interface circuit transmits data to an external.

The shift registers 100 and 110, the clock selection flags 102, 121 and 123, and the serial channel selection flag 111 are written and read by a central processing unit 10 of the microcomputer under a programmed control, for the purpose of controlling the serial interface function.

The other portion of the microcomputer is not shown for simplification of the drawing, and therefore, explanation thereof will be omitted.

Now, operation will be described in connection with the shift register 100. The 8-bit shift register 100 sequentially fetches the level on the SiO terminal 100-2 in synchronism with the clock on the $\overline{SCKO}$ terminal 100-3, and which simultaneously shifts out data stored in the shift register 100 to the SoO terminal 100-1. The clock for the shift operation is supplied either from an external through the SCKO terminal 100-3, or either from the internal clock generation circuit 101. In the case of supplying the clock from the external, the flag 102 is set to a logic value "0", so that the tri-state buffer is rendered off. In the case of using the internal clock, a logic value "1" is set to the clock selection flag 102, so that the output of the clock generation circuit 101 is used.

The shift register 110 is provided with two set of terminals each set including one serial data input terminal, one serial data output terminal and one clock terminal, and the serial channel selection flag 111 is used for selecting either one set of the two sets of terminals. When the serial channel selection flag 111 is at the logic value "1", the Sil terminal 130-2, the Sol terminal 130-1 and the $\overline{SCK7}$ terminal 130-3 are selected as the serial data input terminal, the serial data output terminal and the clock terminal, respectively (These terminals will be called a "serial channel 1" hereinafter). Data on the Si2 terminal 140-2 is blocked by the logic gate 119-2, and data on the Sil terminal 130-2 passes through the logic gates 119-3 and 119-1 so as to be inputted to the shift register 110.

As mentioned above, the output of the shift register 110 is connected in common to the logic gates 114 and 115, but, since the serial channel selection flag 111 is at the logic value "1", the output of the shift register 110 is blocked by the logic gate 115, so that the So2 terminal 140-1 is maintained at the logic value "1". On the other hand, the output of the shift register 110 is transferred to the Sil terminal 130-1.

Similarly, the clock supplied to the shift register 110 is selected by the status of the serial channel selection flag 111. In addition, the clock selection flag 121 designates selection of a source of the clock in connection with the clock terminal 130-3, and the clock selection flag 123 designates selection of a source of the clock in connection with a clock terminal 140-3. Here, if the flag 121 is at the logic value "0", since the tri-state buffer 120 is rendered off, the clock on the $\overline{SCK1}$ terminal 130-3 is supplied to the shift register 110. On the other hand, if the flag 121 is at the logic value "1", the output of the clock generation circuit 112 is supplied through the logic gate 117, the tri-state buffer 120 and the logic gates 116-3 and 11 6-1 to the shift register 110.

When the serial channel selection flag 111 is at the logic value "0", the Si2 terminal 140-2, the So2 terminal 140-1 and the $\overline{SCK2}$ terminal 140-3 are selected as the serial dam input terminal, the serial data output terminal and the clock terminal, respectively (These terminals will be called a "serial channel 2" hereinafter). As the input to the shift register 110, data on the Si2 terminal 140-2 is selected by action of the logic gate 119-2, and the data on the Sil terminal 130-2 is blocked by the logic gates 119-3. On the other hand, the output of the shift register 110 is transferred through the logic gate 115 to the So2 terminal 140-1, but the Sil terminal 130-1 is fixed to the logic value "1" by action of the logic gate 114. As the clock supplied to the shift register 110, the clock on the $\overline{SCK2}$ terminal 140-3 is selected by the function of the logic gates 116-1 to 116-3. Which of the external clock and the internal clock is used is designated by the clock selection flag 123.

Figure 2:
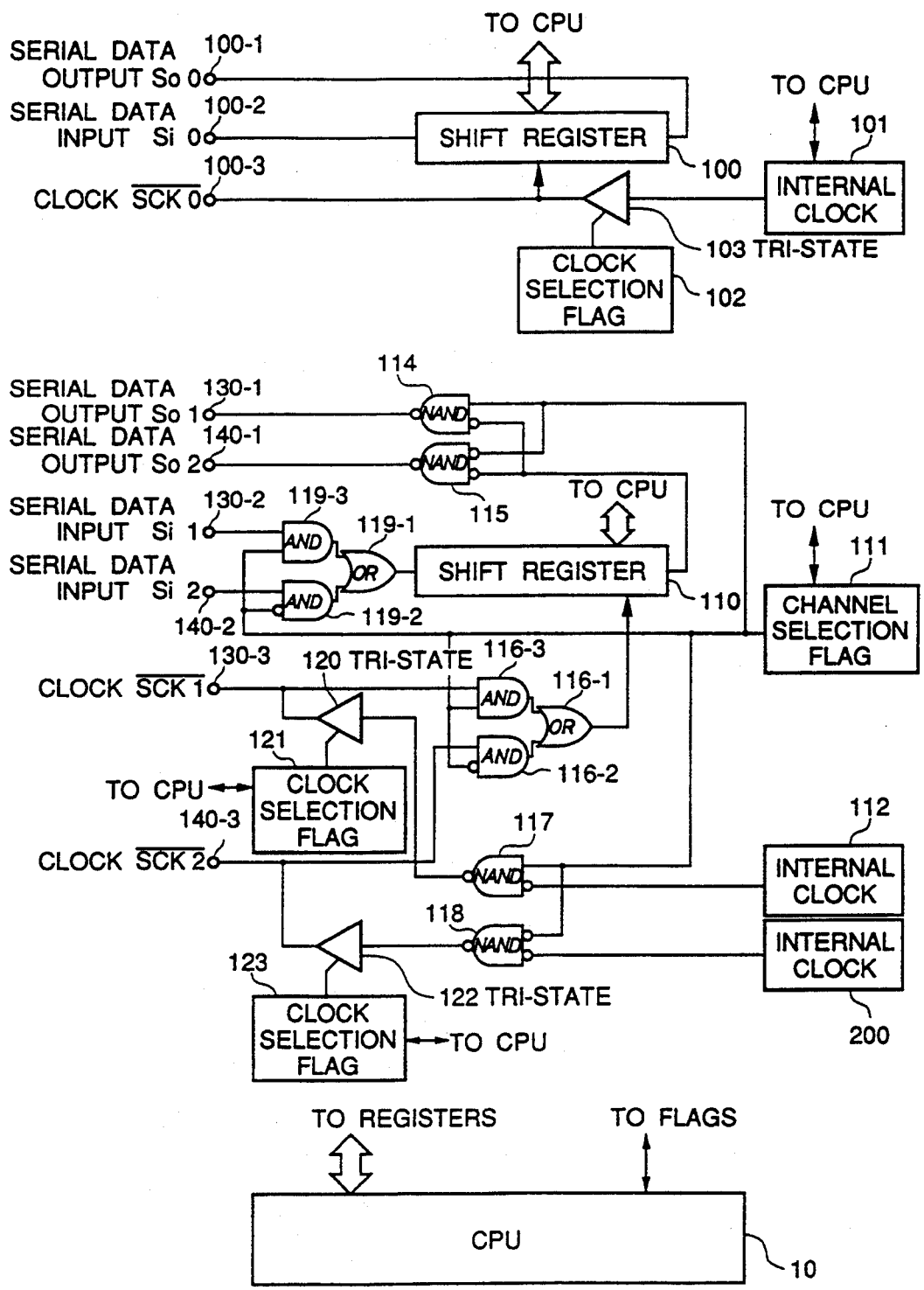
FIG. 2 is a block diagram of a second embodiment of the serial interface in accordance with the present invention.

FIG. 2 is a circuit diagram of another embodiment of the present invention. In this second embodiment, a clock generation circuit 200 is newly added to the first embodiment, so that the clock generation circuit 112 is exclusively used for the "serial channel 1", and the clock generation circuit 200 is exclusively used for the "serial channel 2". Therefore, different transfer rates can be used for different serial channels, respectively. Since the other operation of the second embodiment is the same as that of the first embodiment, further explanation will be omitted.

As seen from the above explanation, the present invention has a practical advantage capable of providing an inexpensive multi-channel serial interface function. The shown embodiments am an example of two channels shown, but may be modified to select one of three or more channels.

The invention has thus been shown and described with reference to the specific embodiments. However, it should be noted that the present invention is in no way limited to the details of the illustrated structures but changes and modifications may be made within the scope of the appended claims.

I claim:

1. A serial interface circuit internally provided in a microcomputer, the serial interface circuit comprising:
   at least two serial data input terminals
   at least two serial data output terminals and a clock terminal,
   a shift register having a data input, a data output and a clock input and configured to perform a shift operation in synchronism with a clock signal applied to said clock input so that data inputted to said data input is shifted into said shift register and data stored in the shift register is shifted out from said data output,
   output selection means having an input connected to said data output of said shift register and at least two outputs connected to said at least two serial data output terminals,
   input selection means having at least two inputs connected to said at least two serial data input terminals and an output connected to said data input of said shift register, and
   channel selection means coupled to said input and output selection means to control said input and output selection means in such a manner that one of said at least two serial data input terminals is selected by said input selection means and coupled to said data input of said shift register, and a corresponding one of said at least two serial data output terminals is selected by said output selection means and coupled to said data output of said shift register,
   at least two clock terminals,
   first clock selection means having at least two inputs connected to said at least two clock terminals and an output connected to said clock input of said shift register,
   said channel selection means being coupled to said input, output, and first clock selection means to control said input, output, and first clock selection means in such a manner that one of said at least two serial data input terminals is selected by said input selection means and coupled to said data input of said shift register and a corresponding one of said at least two clock terminals is selected by said first clock selection means and coupled to said clock input of said shift register, and a corresponding one of said at least two serial data output terminals is selected by said output selection means and coupled to said data output of said shift register, and
   internal clock generation means having an internal clock output connected to second clock selection means controlled by said channel selection means,
   wherein each of said at least two clock terminals is connected through switching means to a corresponding output of said second clock selection means,
   said switching means being controlled by an associated clock selection flag, so that one of an external clock supplied to the clock terminal and an internal clock generated by said internal clock generation means is selected by said associated clock selection flag and supplied to said first clock selection means.

2. A serial interface circuit claimed in claim 1 wherein said switching means comprises a tri-state buffer having a control input connected to said associated dock selection flag,
   an input of said tri-state buffer being connected to said second clock selection means and an output of said tri-state buffer being connected to a corresponding one of said at least two clock terminals.

3. A serial interface circuit internally provided in a microcomputer, the serial interface circuit comprising:
   at least two serial data input terminals,
   at least two serial data output terminals and a clock terminal,
   a shift register having a data input, a data output and a clock input and configured to perform a shift operation in synchronism with a clock signal applied to said clock input so that data inputted to said data input is shifted into said shift register and data stored in the shift register is shifted out from said data output,
   output selection means having an input connected to said data output of said shift register and at least two outputs connected to said at least two serial data output terminals,
   input selection means having at least two inputs connected to said at least two serial data input terminals and an output connected to said data input of said shift register,
   channel selection means coupled to said input and output selection means to control said input and output selection means in such a manner that one of said at least two serial data input terminals is selected by said input selection means and coupled to said data input of said shift register, and a corresponding one of said at least two serial data output terminals is selected by said output selection means and coupled to said data output of said shift register,
   at least two clock terminals,
   first clock selection means having at least two inputs connected to said at least two clock terminals and an output connected to said clock input of said shift register,
   said channel selection means being coupled to said input, output, and first clock selection means to control said input, output, and first clock selection means in such a manner that one of said at least two serial data input terminals is selected by said input selection means and coupled to said data input of said shift register and a corresponding one of said at least two clock terminals is selected by said first clock selection means and coupled to said clock input of said shift register, and a corresponding one of said at least two serial data output terminals is selected by said output selection means and coupled to said data output of said shift register, and
   second clock selection means and at least two internal clock generation means each having an internal clock output connected to one of a corresponding number of inputs of a second clock selection means, said second clock selection means having a corresponding number of output and being controlled by said channel selection means, so that one of said at least two internal clock generation means is selected by said second clock selection means and outputted from a corresponding one of said outputs of said second clock selection means, wherein each of said at least two clock terminals is connected through switching means to a corresponding one of said outputs of said second clock selection means, said switching means being controlled by an associated clock selection flag, so that one of an external clock supplied to the clock terminal and an internal clock generated by said internal clock generation means is selected by said associated clock selection flag and supplied to said first clock selection means.

4. A serial interface circuit claimed in claim 3 wherein said switching means comprises a tri-state buffer having a control input connected to said associated clock selection flag, an input of said tri-state buffer being connected to said second clock selection means and an output of said tri-state buffer being connected to a corresponding one of said at least two clock terminals.

* * * * *